United States Patent
Tornero

[11] Patent Number: 5,338,133
[45] Date of Patent: Aug. 16, 1994

[54] LEVER CLAMP MECHANISM

[76] Inventor: Lino E. Tornero, 809 Quailmeadow La., Colfax, N.C. 27235

[21] Appl. No.: 26,602

[22] Filed: Mar. 5, 1993

[51] Int. Cl.5 .................................................. A47C 7/00
[52] U.S. Cl. ...................................... 403/321; 403/326;
403/373; 403/83; 297/411.37; 248/415
[58] Field of Search .................... 403/104, 110, 83, 44,
403/43, 325, 321, 322, 326, 374, 373, 87;
297/411.37 R, 383; 248/415 R, 425, 289.1

[56] References Cited

U.S. PATENT DOCUMENTS

| | | | |
|---|---|---|---|
| 2,360,788 | 10/1944 | Murphy | 297/383 |
| 3,720,443 | 3/1973 | Mourgue | 297/383 |
| 4,036,525 | 7/1977 | Howk | 403/325 |
| 4,786,201 | 11/1988 | Huetter et al. | 403/44 |
| 5,082,328 | 1/1992 | Garelick | 248/415 |
| 5,249,879 | 10/1993 | Zoor | 403/374 |

FOREIGN PATENT DOCUMENTS 2518216  6/1986  France .................................. 248/418

*Primary Examiner*—Randolph A. Reese
*Assistant Examiner*—Anthony Knight

[57] ABSTRACT

A lever operated clamping mechanism for adjustably engaging and locking in position structural members comprising two shoulder bolts and a disk spring for attaching and slidably guiding a slotted structure member relative to a fixed support structure. A threaded lever engages one of the shoulder bolts for frictionally locking the position of the structural member relative to the support structure. The device acts as a positional clutch permitting substantially firm frictional engagement of structural members when the lever is in one position and firm yet slidable engagement of the structural members when the lever is in another position.

14 Claims, 2 Drawing Sheets

LEVER CLAMP MECHANISM

FIELD OF THE INVENTION

The invention herein pertains to slidable structural members and particularly to furniture structural members such as arm supports as may be releasably adjusted with a manual lever.

BACKGROUND AND SUMMARY OF THE INVENTION

The present invention relates in general to devices which provide for the selective adjustment and positioning of movable structural components relative to one another. As will be seen, the device is ideally suited for use in furniture, particularly office furniture, where the current market emphasis on ergonomic design calls for adjustable furniture structures such as used with certain chairs that can be adjustably positioned to fit different individuals with various height, weight and job tasks.

Primarily the device is intended for the positioning of components where frictional locking means is sufficient and load forces are moderate, such as chair arms and back uprights. Here the device can be advantageously used to laterally position the arms so as to accommodate users of different body widths.

In the prior art, chair arm lateral adjustment has been accomplished by means of structural members or "J-bars" provided with elongated slots and bolted to the undercarriage or seat pan of the chair. Adjustment was generally accomplished by reaching under the chair with a specialized tool or wrench and loosening and tightening several bolts. This is a very time consuming operation and cannot be accomplished by the chair occupant while seated, often necessitating the intervention of a maintenance crew. In situations where the same chair is used by several shifts it is often the case that occupants find it difficult to sit comfortably since adjustment of the chair between shifts is generally not possible.

The device and object of the present invention provides for the quick manual positioning and changing of one structural component relative to another. In particular, where office chairs are concerned, the device may serve to laterally position chair arms relative to a chair seat at any of an infinity number of positions within a predetermined range. It will appear clear from the subsequent specification that the device is not limited to use in chairs and articles of furniture but in any use where reliable and economical structural adjustment is sought. In a chair, the mechanism comprises a first shoulder bolt which is threaded on one end with a common thread and on the other end a strong fast-advance thread is used such as an acme thread. A second shoulder bolt is also used which is threaded with a common thread on one end and has a hex head on the opposite end. These shoulder bolts are installed at a predetermined distance from each other with the shoulders in sliding contact with the sides of an elongated slot in the structural element of the chair arm. These bolts are threadably attached to a fixed component such as on the underside of the chair seat or to an adapter plate thereon (pre-installed) to provide a flat surface on the underside of the chair for sliding of the chair arm structural member therealong. A spring disk, known as a Belleville washer, is located on the second shoulder bolt against the chair arm structural member. The lengths of the bolt shoulders are sufficient to allow for free sliding motion of the chair arm member relative to the bolts. Therefore, the Belleville washer is selected so that the second shoulder bolt necessarily compresses said Belleville washer when the bolt is completely inserted (tightened). The compression of the Belleville washer causes the chair arm structural member to remain in sliding, yet firm contact with the underside of the chair or adapter plate and prevents excessive play between the surfaces. A fast advance or acme thread nut is made integral with a lever arm and its threads engage the corresponding threads of the first shoulder bolt. The first shoulder bolt is threadably joined to the adapter plate or chair undercarriage and is prevented from loosening by a lock nut or other suitable means, in such a way that, rotating the lever arm acme nut in one direction increases the friction while rotating the lever arm acme nut in a second opposite direction decreases the friction between the chair arm member and the undercarriage of the chair. Thus, it is possible to operate said lever arm nut while remaining seated on the chair by simply rotating the lever arm from one position to the other. The positions of the lever arm are limited by virtue of the design of the lever arm, which surrounds the head of the second shoulder bolt within an elongated c-shaped slot so that the head of the shoulder bolt limits the travel of the lever arm to the ends of said c-shaped slot. When the lever arm is in the position that causes the greatest friction between the chair arm structural member and the chair undercarriage (fixed component) the device is in the "locked" position and lateral displacement of the chair arm relative to the chair seat is prevented. The opposite is true when the lever arm is in the position that causes least friction between the chair arm structural member and the chair undercarriage because the mechanism is "unlocked", and lateral displacement of the chair arm relative to the chair seat is easily accomplished by manual effort.

The advantages of the device are numerous since it is possible for the chair occupant to remain seated while adjusting the lateral positions of the chair arms and can accomplish this without the use of specialized tools or help from maintenance crews. Furthermore the device is simple to manufacture and install, and by virtue of its geometry can operate with any size of chair arm structural members or arm uprights. The device is also easy to partially conceal under the chair where it does not interfere with normal use of the chair.

BRIEF DESCRIPTION OF THE DRAWINGS

In order to better understand the features of the invention the following drawings of the preferred embodiment have been provided.

DETAILED DESCRIPTION OF THE DRAWINGS AND OPERATION OF THE INVENTION

Figure 1:
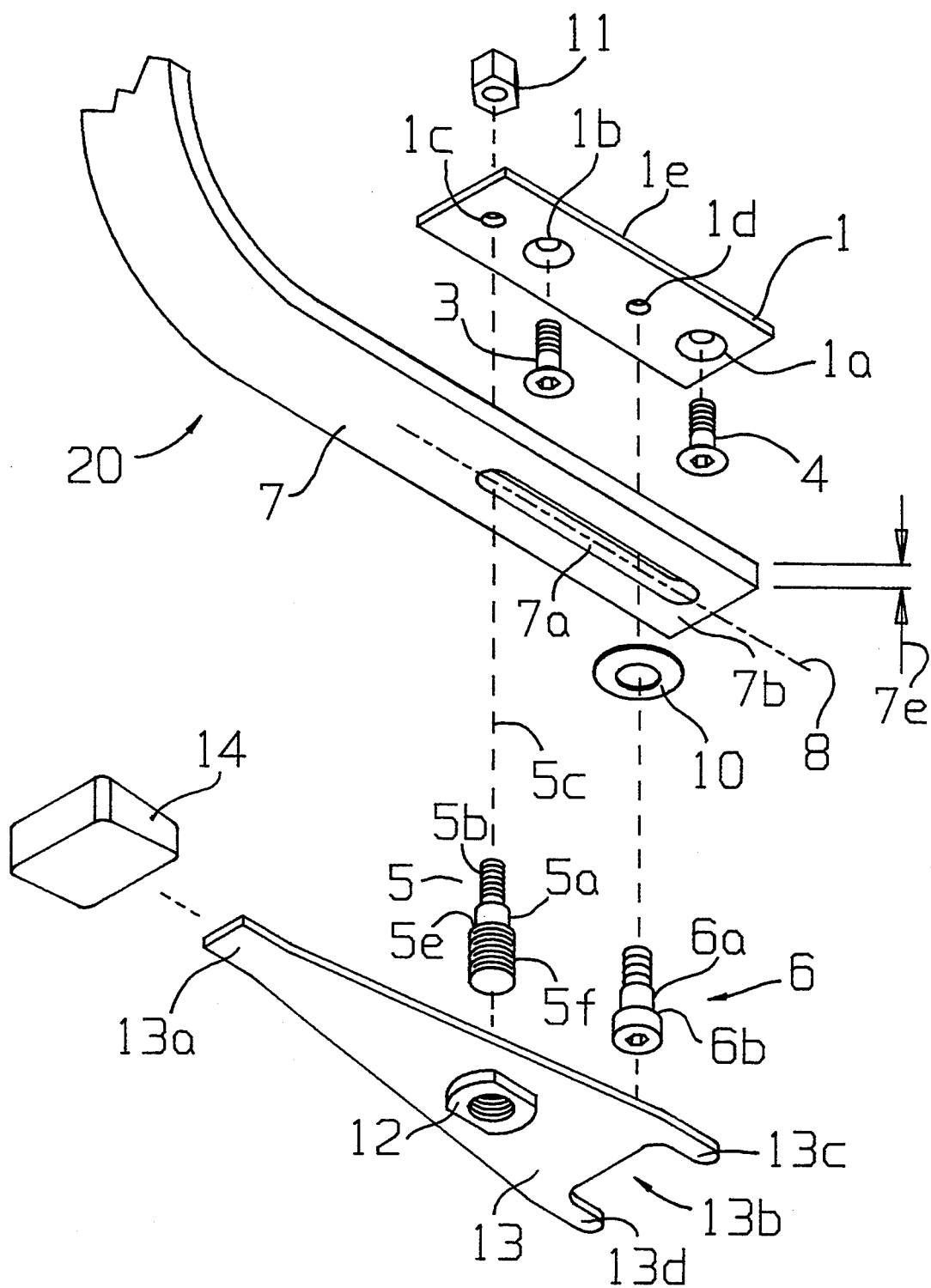
FIG. 1 is an exploded view of the mechanism and includes an adapter plate, screws, chair arm structural member, spring means disk spring (Belleville washer), a first shoulder bolt and a second shoulder bolt, a lock nut, a fast advance nut integral with a lever arm, and a knob.
Figure 2:
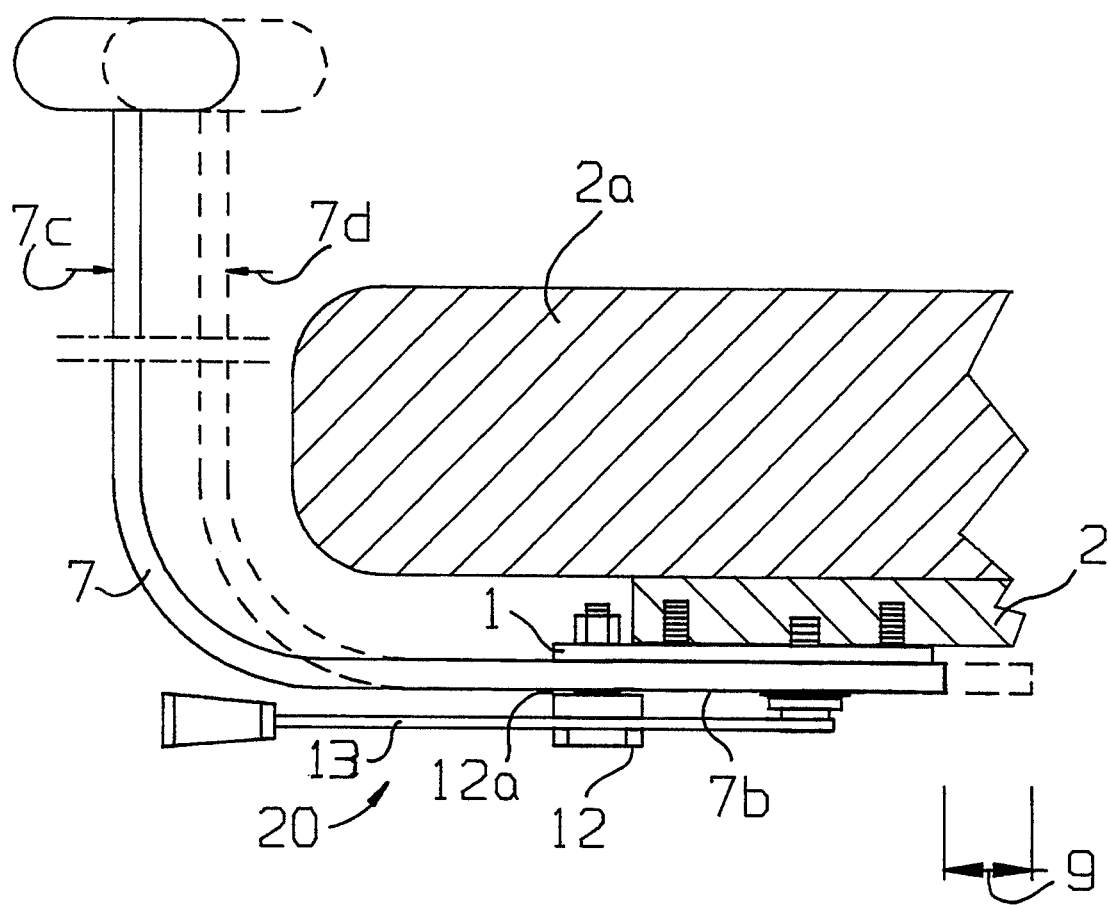
FIG. 2 is a partial cross sectional view of the device attached to the chair undercarriage.
Figure 3:
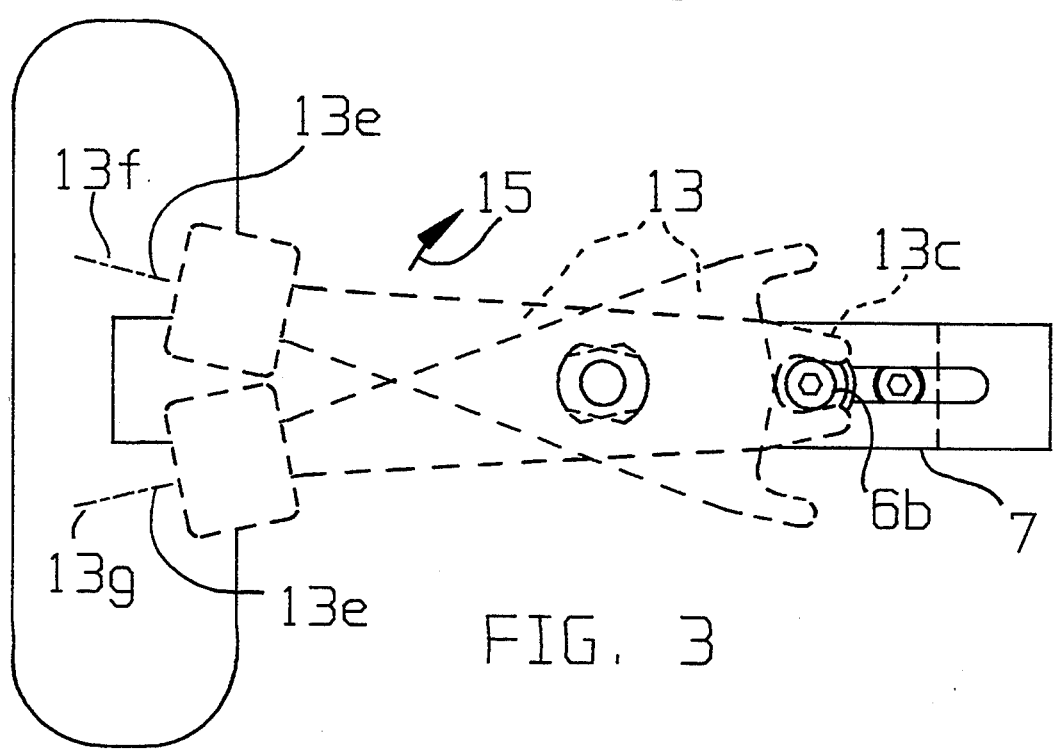
FIG. 3 is a view of the device seen from the bottom up and showing the lever arm in locked and unlocked positions.

The object of the invention can be achieved in an advantageous manner by the arrangement of the elements shown in the accompanying drawings of which the following are detailed descriptions:

Referring to FIGS. 1, 2 and 3, an exploded view of a preferred form of locking clamp mechanism device 20 is shown in FIG. 1 comprising a fixed adapter plate 1 provided with holes 1a and 1b for attachment to chair undercarriage 2 (FIG. 2) by means of screws 3 and 4. Said undercarriage 2, itself not the object of the invention, is normally attached to the bottom portion of a chair seat 2a, also itself not the object of the invention. Adapter plate 1 which is referred to as a fixed component is also provided with threaded holes 1c and 1d for threadable reception of a first shoulder bolt 5 and a second shoulder bolt 6. A chair arm structural member 7, is provided with an elongated slot 7a capable of engaging in sliding contact with shoulders 5a and 6a of bolts 5 and 6 in such a way that member 7 is able to displace along, parallel to an axis 8 running through the centers of bolts 5 and 6, for an arbitrary distance 9 shown in FIG. 2. The height of shoulders 5a and 6a is selected to be only slightly greater than thickness 7e of chair arm structural member 7. A spring means or Belleville washer 10 is located under head 6b of second shoulder bolt 6 against bottom face 7b of arm structural member 7 in such a way that it is always compressed an adequate amount to permit arm structural member 7 to displace relative to undercarriage 2 in response to moderate manual effort shown in FIG. 2 as forces 7c and 7d. Shoulder bolt 5 is provided with threaded portion 5b so as to receive lock nut 11 along upper face 1e of adapter plate 1 and to securely attach shoulder bolt 5 to adapter plate 1 in such a way that rotation of shoulder bolt 5 about axis 5c is restricted and terminal end 5e of the fast advance thread 5f remains always stationary relative to arm structural member 7. Fast advance nut 12 is permanently affixed or otherwise made integral with lever arm 13. Lever arm 13 exhibits one end 13a suitable for installation of a knob 14 and opposite end 13b is c-shaped to provide two limit nibs 13c and 13d. Fast advance nut 12 is engaged with fast advance thread 5f of shoulder bolt 5 in such a way that face 12a, shown in FIG. 2, of fast advance nut 12 is not in contact with face 7b of the chair arm structural member 7 when, referring also to FIG. 3, axis 13e of lever arm 13 is oriented to an "unlocked" position 13f, and so that when lever 13 is in the "locked" position 13g face 12a of fast advance nut 12 is under pressure contact with face 7b of chair arm structural member 7, in turn creating frictional contact between chair arm structural member 7 and adapter plate 1.

Operation of mechanism 20 is accomplished by manually, adequately displacing arm structural member 7 in a direction responsive to forces 7c or 7d, and "locking" mechanism or device 20 by applying manual force to lever arm 13 in direction 15 to advance fast advance nut 12 and thus increase the friction force between chair arm structural member 7 and adapter plate 1 until the limit nib 13c comes in contact with head 6b of shoulder bolt 6, preventing further angularly movement of lever arm 13 or, "unlocking" the device by reversing the "locking" motion of lever 13. Arm lever 13 may only move a total of twenty-four degrees to fully unlock and lock structural member 7 for rapid adjustment.

It is to be understood that the device is not limited to use in chairs, it being adaptable for use where it is necessary to releasably and lockably adjust the displacement of one member relative to another member such as on items with extendable arms or legs. It will be apparent that many useful modifications of the device are possible without departing from the fundamental basis of the invention and the illustrations and examples provided herein are for explanatory purposes only and are not intended to limit the scope of the appended claims.

I claim:

1. A clamp mechanism comprising: a structural member, said structural member defining an elongated slot, a fixed component, a first shoulder bolt, said shoulder bolt comprising a pair of threaded ends, one of said ends comprising standard threads and the other of said ends comprising fast advance threads, said first shoulder bolt extending through said elongated slot of said structural member and attached to said fixed component, a rotatable lever arm, said lever arm threadly attached to said first shoulder bolt by said fast advance threads whereby rotation of said lever arm in a first direction tightens said structural member against said fixed component and rotation of said lever arm in the opposite direction loosens said structural member allowing said structural member to slide along said fixed component.

2. The clamp mechanism of claim 1 and including a second shoulder bolt, said second shoulder bolt attached at one end to said fixed component and extending through said elongated slot of said structural member for slidable contact therewith.

3. The clamp mechanism of claim 2 and including a spring, said spring positioned on said second shoulder bolt against said structural member.

4. The clamp mechanism of claim 2 wherein said lever arm defines a c-shaped end.

5. The clamp mechanism of claim 4 wherein said c-shaped end is positioned proximate said second shoulder bolt to terminate rotational movement of said lever arm.

6. The clamp mechanism of claim 3 wherein said spring comprises a washer.

7. The clamp mechanism of claim 2 wherein said lever arm comprises a pair of nibs, said nibs positioned proximate said second shoulder bolt to terminate rotational movement of said lever arm.

8. A clamp mechanism for positionally adjusting and releasably locking a structural member having a slot in a plurality of positions relative to a fixed component comprising:
   a. a first shoulder bolt in sliding contact with said slot of said structural member, said first shoulder bolt secured to said fixed component,
   b. a second shoulder bolt, said second shoulder bolt in sliding contact with said slot of said structural member, said second shoulder bolt secured to said fixed component spatially from said first shoulder bolt,
   c. a rotatable lever arm, said lever arm threadably attached to said first shoulder bolt, said lever arm comprising two nibs, said nibs disposed to contact said second shoulder bolt to limit the angular displacement as said lever arm rotates whereby rotation of said lever arm in a first direction tightens said structural member against said fixed component and rotation of said lever arm in the opposite direction loosens said structural member, allowing said structural member to slide along said fixed component.

9. The mechanism according to claim 8 and including a spring, said spring positioned on said second shoulder bolt against said structural member.

10. The mechanism according to claim 8 wherein said first shoulder bolt comprises a fast advance thread.

11. A clamp mechanism comprising: a structural member, said structural member defining an elongated slot, a fixed component, a first shoulder member, said first shoulder member extending through said elongated slot and attached at one end to said fixed component, a second shoulder member, said second shoulder member extending through said elongated slot and attached at one end to said fixed component, and a rotatable lever arm, said lever arm attached to said first shoulder member, said lever arm comprising a nib, said nib for contacting said second shoulder member to limit rotational movement of said lever arm.

12. The clamp mechanism according to claim 11 wherein said first shoulder member comprises fast advance threads, said lever arm attached to said fast advance threads.

13. The clamp mechanism of claim 12 wherein said first shoulder member also comprises standard threads, said standard threads located on said shoulder member end opposite said fast advance threads.

14. The clamp mechanism of claim 11 wherein said lever arm also comprises a second nib, said second nib for contacting said second shoulder member to limit rotational movement of said lever arm.

* * * * *